US006185054B1

(12) United States Patent
Senesi

(10) Patent No.: US 6,185,054 B1
(45) Date of Patent: Feb. 6, 2001

(54) APPARATUS AND METHOD FOR MOUNTING POLE PIECE IN ELECTROMAGNETIC LENS

(75) Inventor: Joseph J. Senesi, Poughquag, NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/400,924

(22) Filed: Sep. 22, 1999

(51) Int. Cl.[7] ................................ G02B 7/02; G21K 1/08

(52) U.S. Cl. .................................... 359/824; 250/396 ML

(58) Field of Search .................................... 359/813, 814, 359/824; 369/44.15; 250/396 ML

(56) References Cited

U.S. PATENT DOCUMENTS 5,338,939 * 8/1994 Nishino et al. ............... 250/396 ML
5,382,800 * 1/1995 Nishino et al. ............... 250/396 ML
5,629,526 * 5/1997 Nakasuji ....................... 359/396 ML
5,900,667 * 5/1999 Veneklasen et al. ................. 257/429

* cited by examiner

*Primary Examiner*—Ricky Mack
(74) *Attorney, Agent, or Firm*—Venable; John P. Shannon

(57) ABSTRACT

A ferrite pole piece is mounted in an electromagnetic lens by placing a mounting ring around the pole piece and securing it with an adhesive. The internal diameter of the mounting ring is sufficiently greater than the outer diameter of the pole piece that the ferrite is not chipped when the mounting ring is placed around the pole piece. The pole piece, with the mounting ring secured, is inserted in a centering plate in the lens, and the mounting ring is secured to the centering plate.

16 Claims, 2 Drawing Sheets

APPARATUS AND METHOD FOR MOUNTING POLE PIECE IN ELECTROMAGNETIC LENS

BACKGROUND OF THE INVENTION

The present invention relates to forming circuit patterns in semiconductor wafers using electron beam lithography and, more particularly, to an apparatus and method for mounting a ceramic ferrite pole piece in an electromagnetic lens of an electron beam system used in such lithography.

Pole pieces must be located accurately within an electromagnetic lens. Ferrite is a magnetic ceramic, and a pole piece made of ferrite is the focusing part of the lens. It is critical that the pole piece be centered in the lens so that an electromagnetic field which focuses the electron beam is centered. In conventional electron beam systems, the centering of the ceramic ferrite pole piece is accomplished by inserting the pole piece into a metal centering plate having an opening whose diameter is larger by only a very small tolerance than the outer diameter of the pole piece. Ferrite pole pieces are fragile, and the close tolerance between the pole piece and the centering plate subjects the pole piece to chipping and even breaking during assembly and disassembly. The pole pieces must be removed sometimes for maintenance and then replaced. This increases the exposure of the pole piece to chipping and breaking. Although external chipping does not pose a serious problem in itself, it can lead to the breaking of a pole piece. The ferrite used for the pole pieces is expensive and has a long manufacturing lead time.

SUMMARY OF THE INVENTION

By the present invention, ferrite pole pieces are accurately centered within electromagnetic lenses of electron beam systems without chipping or breaking of the pole pieces.

In order to achieve this advantage, an opening through a centering plate of an electron beam system is made larger than is conventional, and a steel mounting ring is fixed around the pole piece and then secured to the centering plate. The mounting ring has an inner diameter sufficiently greater than the outer diameter of the pole piece that a gap is present and chipping is not a problem. An epoxy adhesive is applied to the inner diameter of the mounting ring, particularly in annular grooves provided for that purpose, and the pole piece is inserted in the opening through the mounting ring and centered using shims.

The mounting ring has a flange extending radially outward, and diametrically opposed alignment apertures are defined through the flange. When the epoxy adhesive has cured, the assembly of the pole piece and the mounting ring is inserted into the opening through the centering plate such that the flange overlies the centering plate, and the alignment apertures in the flange are aligned with corresponding apertures in the mounting plate. Precision dowel pins only slightly smaller in diameter than the diameter of the alignment apertures are inserted through the aligned apertures of the mounting ring and the centering plate for precise positioning of the pole piece assembly. Screws are inserted through the other aligned apertures to fix the assembly to the mounting plate. When the centering apertures are aligned, fastener openings spaced around the ring are aligned with corresponding fastener openings in the centering plate, so that fasteners can be inserted to secure the mounting ring to the centering plate.

DETAILED DESCRIPTION OF THE PREFERRED EMBODIMENTS

Figure 1:
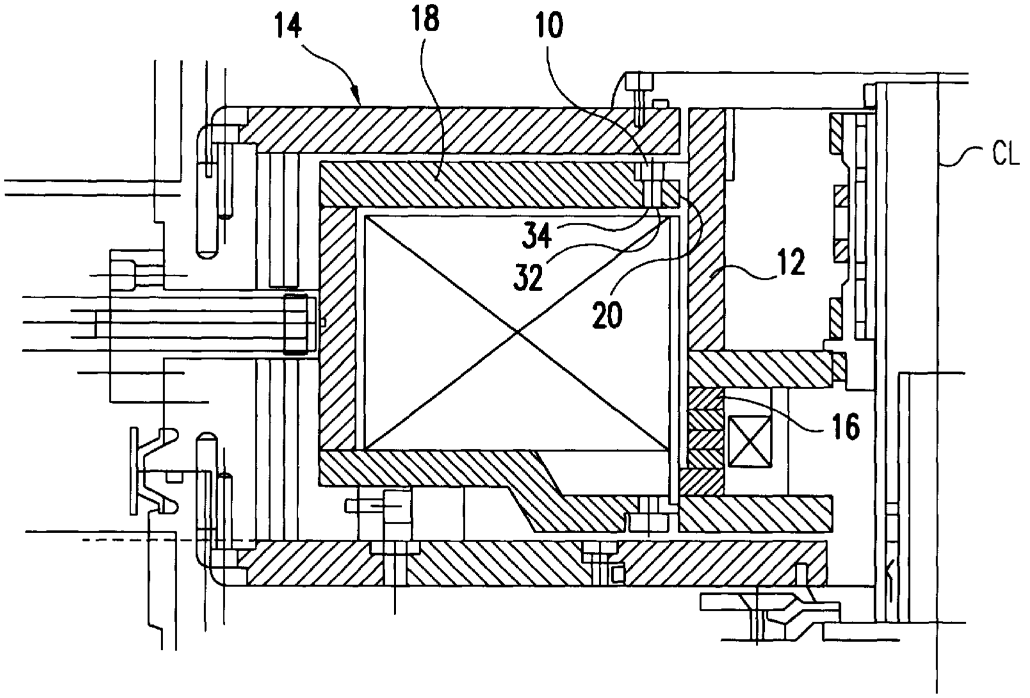
FIG. 1 is a cross-section through the left side of an electromagnetic lens in which a pole piece is mounted according to the present invention.

As can be seen from FIG. 1, the apparatus according to the present invention, which is designated generally by the reference numeral 10, is mounted on a ferrite ceramic pole piece 12 in an electromagnetic lens 14 of an electron beam system used for forming circuit patterns on semiconductor wafers using electron beam lithography. FIG. 1 illustrates a cross-section through a left side of such a lens 14, a similar cross-section existing on the right side of the center line CL, which defines a central axis of the pole piece. The pole piece 12 is an upper pole piece, a lower pole piece 16 also being present in the lens 14. A horizontal steel centering plate 18 is fixed in the lens 14 to support the pole piece 12, the centering plate having a main opening 20 for receiving the pole piece 12. The main opening 20 is sufficiently larger than the outer diameter of the pole piece 12 that a gap exists between the pole piece and the centering plate 18, when the pole piece is in an operative position within the main opening. The center line CL also defines a central axis for the main opening 20 of the centering plate 18 in FIG. 1.

Figure 2:
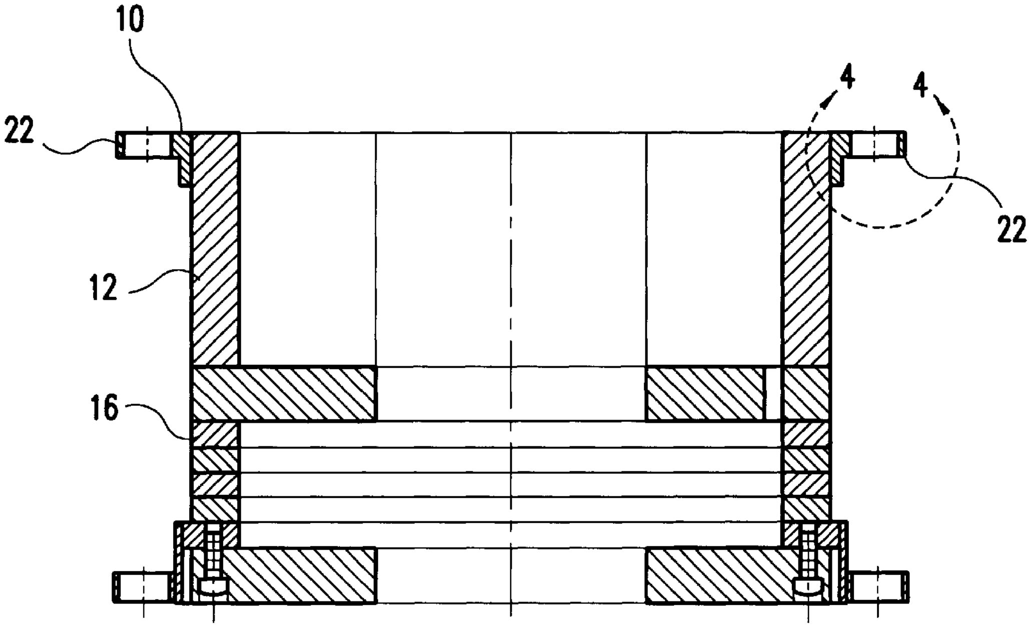
FIG. 2 is an enlarged cross-section of the pole piece and a mounting ring of FIG. 1.
Figure 3:
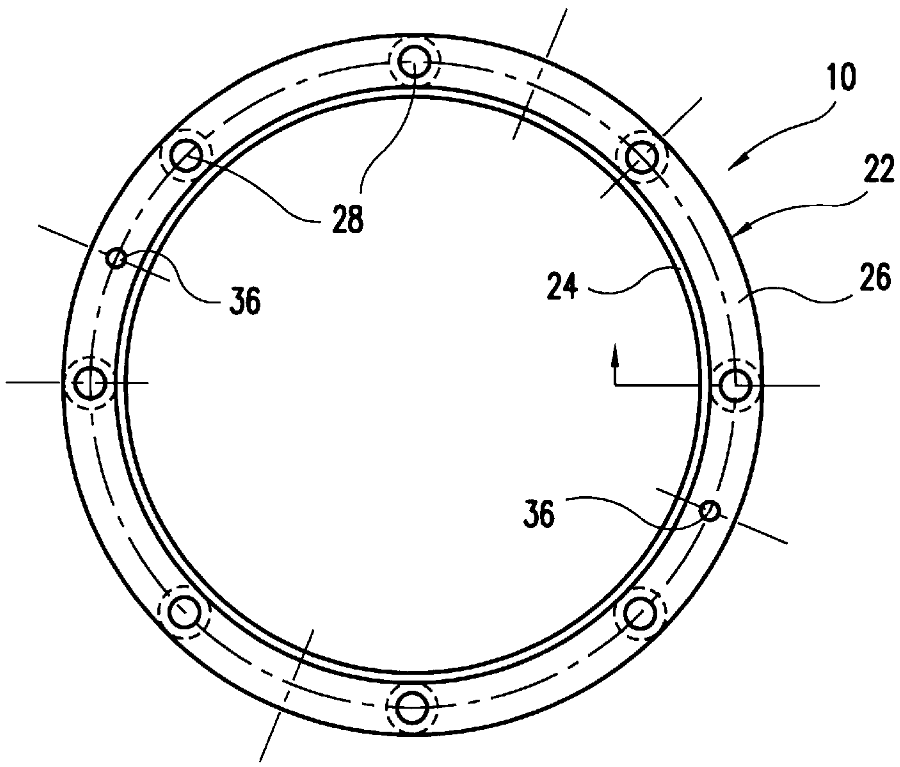
FIG. 3 is a bottom plan view of the mounting ring of FIG. 2.
Figure 4:
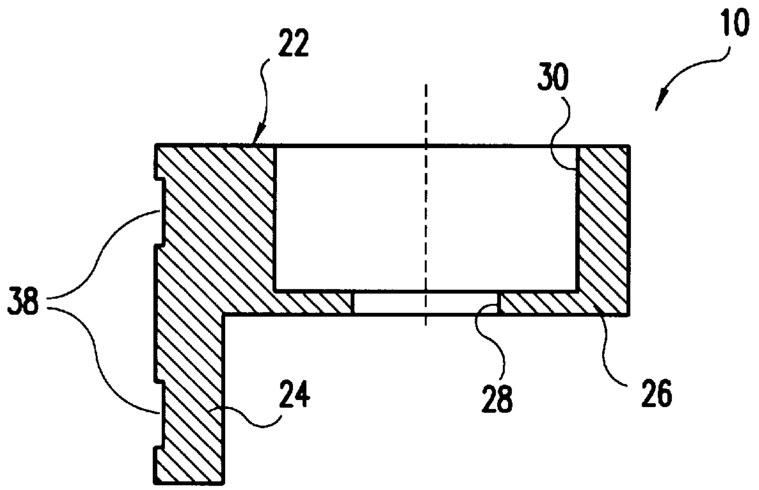
FIG. 4 is an enlargement of the portion of the mounting ring within the circle 4—4 in FIG. 2.

As can best be seen from FIGS. 2–4, the apparatus according to the present invention comprises a steel mounting ring 22 having an axial flange 24 extending parallel to a central axis of the mounting ring and a radial flange 26 extending radially outward from the central axis. The radial flange 26 defines a plurality of openings 28 in recesses 30 for receiving fasteners, such as screws, to secure the mounting ring 22 to the centering plate 18. The centering plate 18 has corresponding openings 32 (FIG. 1) with which the openings 28 in the radial flange 26 are aligned, and fasteners (not shown) are inserted through the aligned openings 28, 32 and tightened. The centering plate 18 has a radially inwardly directed flange 34 (FIG. 1) defining an upper surface on which the radially outward flange 26 of the mounting ring 22 is supported.

As can be appreciated from FIG. 3, a plurality of the fastener openings 28 are defined at equiangular positions around the circumference of the mounting ring 22, and the fastener openings 32 in the centering plate 18 are similarly positioned. In addition, the radial flange 26 has dowel-receiving alignment apertures 36 at diametrically opposed locations to precisely position the mounting ring 22 relative to the centering plate 18. The centering plate 18 has correspondingly positioned dowel-receiving alignment apertures. A dowel is inserted into each pair of aligned apertures, the dowel having an outer diameter which fits snugly into each of the apertures, so as to precisely center the mounting ring 22 on the centering plate 18.

The mounting ring 22 has an inner diameter which is sufficiently greater than the outer diameter of the pole piece 12 that a gap is present between the pole piece and the mounting ring, and the mounting ring can be placed above the pole piece and moved axially around the pole piece without forcibly engaging the pole piece. The inner diameter of the mounting ring 22 is on the order of 10 mils greater than the outer diameter of the pole piece 12. As can be seen from FIG. 4, an inner surface of the mounting ring 22 defines annular grooves 38 for receiving an adhesive, so that the mounting ring can be secured to the pole piece 12 by the adhesive. An epoxy adhesive has been found to be suitable.

In order to mount and center the pole piece 12, the mounting ring 22 is moved axially around the pole piece and then centered with respect to the pole piece by selecting and inserting appropriately sized shims into a gap between the mounting ring and the pole piece. Three shims spaced from one another by 120° around the pole piece 12 can be used. The mounting ring 22 and the shims are removed from the pole piece, and the adhesive is inserted into the annular grooves 38 on the inner surface of the mounting ring 22. The adhesive is wiped from the mounting ring 22 in the areas to be occupied by the shims, and the shims are again positioned in those areas, with portions of the shims extending above and below the mounting ring, so that they can be grasped. The mounting ring 22, with the shims in place, is again moved onto the pole piece 12. Any adhesive on the pole piece 12 outside the mounting ring 22 is wiped off, and the adhesive between the mounting ring 22 and the pole piece 12 is allowed to cure. The portions of the shims extending above and below the mounting ring are cut off. The assembly of the pole piece 12 and the mounting ring 22 is inserted into the main opening 20 of the centering plate 18 until the radially outward flange 26 on the mounting ring rests on the radially inward flange 34 on the centering plate, and the dowel-receiving alignment apertures 36 on the mounting ring are generally aligned with the corresponding dowel-receiving alignment apertures on the centering plate. The precisely dimensioned dowels are inserted into the aligned apertures, by which the position of the mounting ring 22 relative to the centering plate 18 is adjusted, if necessary, and precisely located. Fasteners are inserted into the aligned openings 28 in the mounting ring 22 and openings 32 in the centering plate 18 and tightened to fix the mounting ring to the centering plate.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

What is claimed is:

1. Apparatus for accurately positioning a ferrite pole piece in an electromagnetic lens, wherein the pole piece has an outer diameter, comprising:

a mounting ring for positioning around the pole piece, said mounting ring having an inner diameter sufficiently larger than the outer diameter of the pole piece that a gap is present between the mounting ring and the pole piece; and an adhesive substantially filling the gap and securing the ring to the pole piece, wherein the ring has a surface in contact with the adhesive and a structure spaced radially outward from said surface, said structure being adapted to be secured to other structure of the electromagnetic lens.

2. The apparatus of claim 1, wherein the mounting ring is made of steel.

3. The apparatus of claim 1, wherein the inner diameter of said mounting ring is approximately 10 mils larger than the outer diameter of the pole piece.

4. The apparatus of claim 1, wherein the adhesive is an epoxy.

5. The apparatus of claim 1, wherein the surface of the ring in contact with the adhesive defines at least one groove for receiving the adhesive.

6. The apparatus of claim 1, wherein the structure of the ring spaced radially outward defines openings for receiving fasteners for securing the ring to other structure of the electromagnetic lens.

7. The apparatus of claim 1, wherein the pole piece defines a central axis, and the structure of the mounting ring spaced radially outward defines alignment apertures each having a central axis generally parallel to the central axis of the pole piece, and dowels positioned in said alignment apertures, whereby said apertures can be precisely aligned with corresponding alignment apertures in other structure of the electromagnetic lens, and the pole piece can be precisely aligned with respect to the rest of the electromagnetic lens.

8. The apparatus of claim 1, further comprising said other structure of the electromagnetic lens, wherein the pole piece defines a central axis, and said other structure comprises a centering plate extending transverse to said central axis, said centering plate having a main opening receiving said pole piece, with a gap being present between the pole piece and the opening in the plate.

9. The apparatus of claim 8, wherein the structure of the ring spaced radially outward defines openings for receiving fasteners, said centering plate defines corresponding openings in alignment with said openings for receiving fasteners, and the apparatus further comprises fasteners extending through said openings for receiving fasteners and said corresponding openings in order to secure said mounting ring to said plate.

10. The apparatus of claim 8, wherein the main opening in the plate defines a central axis, the structure of the mounting ring spaced radially outward defines apertures each having a central axis generally parallel to the control axis of said main opening, wherein said centering plate defines alignment apertures in alignment with the alignment apertures in the mounting ring, and said dowels are received in the alignment apertures in the mounting ring and the aligned alignment apertures in said plate, wherein the central axis of the pole piece is precisely aligned with the central axis of said main opening of said plate.

11. A method for accurately positioning in an electromagnetic lens a ferrite pole piece having an outer diameter comprising:

placing a mounting ring around the pole piece;

securing the mounting ring to the pole piece;

providing in the electromagnetic lens a centering plate having a main opening having a diameter sufficiently greater than the outer diameter of the pole piece that a gap is present between the plate and the pole piece when the pole piece is in the main opening;

inserting the pole piece into the main opening; and securing the mounting ring to the plate.

12. The method of claim 11, further comprising centering the pole piece in the main opening of the centering plate by aligning alignment apertures in the mounting ring with corresponding alignment apertures in the centering plate and inserting dowels into the aligned alignment apertures.

13. The method of claim 11, wherein the step of placing a mounting ring around the pole piece comprises moving axially relative to the pole piece a mounting ring having an inner diameter sufficiently greater than the outer diameter of the pole piece that a gap is present between the pole piece and the mounting ring when the mounting ring is around the pole piece.

14. The method of claim 13, wherein the step of placing further comprises centering the pole piece relative to the mounting ring by inserting shims into the gap.

15. The method of claim 11, wherein the step of securing comprises fixing the ring to the pole piece using an adhesive.

16. The method of claim 15, wherein the adhesive is placed in at least one groove defined on a surface of the mounting ring facing the pole piece.

* * * * *